United States Patent [19]

Agano et al.

[11] Patent Number: 4,893,012

[45] Date of Patent: Jan. 9, 1990

[54] RADIATION IMAGE READ-OUT AND REPRODUCING APPARATUS

[75] Inventors: Toshitaka Agano; Ryousuke Furue; Hiroyuki Karasawa; Ichirou Miyagawa, all of Kanagawa, Japan

[73] Assignee: Fuji Photo Film Co., Ltd., Kanagawa, Japan

[21] Appl. No.: 195,333

[22] Filed: May 18, 1988

[30] Foreign Application Priority Data

| Jan. 13, 1987 | [JP] | Japan | 62-5266 |
| Jul. 14, 1987 | [JP] | Japan | 62-175487 |
| Jul. 14, 1987 | [JP] | Japan | 62-175488 |
| Dec. 29, 1987 | [JP] | Japan | 62-335505 |

[51] Int. Cl.$^4$ .............................. G03B 42/08
[52] U.S. Cl. .................. 250/327.2; 250/484.1
[58] Field of Search .......... 250/327.2 E, 484.1 B, 250/327.2 H

[56] References Cited

U.S. PATENT DOCUMENTS

| 4,258,264 | 3/1981 | Kotera et al. | 250/484.1 |
| 4,260,997 | 4/1981 | Fukui | 346/108 |
| 4,276,473 | 6/1981 | Kato et al. | 250/327.2 |
| 4,315,318 | 2/1982 | Kato et al. | 382/6 |
| 4,387,428 | 6/1983 | Ishida et al. | 364/413.13 |
| 4,582,989 | 4/1986 | Agano | 250/327.2 |

FOREIGN PATENT DOCUMENTS

| 56-11395 | 2/1981 | Japan | 250/327.2 A |
| 61-86744 | 5/1986 | Japan | 250/327.2 H |
| 61-124938 | 6/1986 | Japan | 250/327.2 H |

Primary Examiner—Constantine Hannaher
Attorney, Agent, or Firm—Sughrue, Mion, Zinn, Macpeak & Seas

[57] ABSTRACT

An image read-out and reproducing apparatus comprises an acousto-optic modulator, and a change-over device for guiding zero-order light and first-order light radiated by the acousto-optic modulator to a predetermined optical path. A deflector deflects a light beam to scan an image-recorded image information sheet or a recording sheet in a main scanning direction, and a sub-scanning device moves the image information sheet or the recording sheet normal to the main scanning direction. When the image information sheet is moved by the sub-scanning device, zero-order light is guided by the change-over device to the predetermined optical path and deflected to scan the image information sheet, thereby to carry out image read-out from the image information sheet. When the recording sheet is moved by the sub-scanning device, first-order light is guided by the change-over device to the predetermined optical path, modulated in accordance with image signals and deflected to scan the recording sheet, thereby to reproduce the image on the recording sheet.

9 Claims, 4 Drawing Sheets

RADIATION IMAGE READ-OUT AND REPRODUCING APPARATUS

This application is a continuation-in-part application of application Ser. No. 143,487 filed Jan. 13, 1988 now abandoned.

BACKGROUND OF THE INVENTION

1. Field of the Invention

This invention relates to an image read-out and reproducing apparatus for carrying out read-out of an image recorded on an image information sheet such as a stimulable phosphor sheet and reproduction of the image thus read out on a recording sheet by use of the same scanning system.

2. Description of the Prior Art

Image read-out apparatuses for reading out an image recorded on a sheet by two-dimensionally scanning a light beam such as a laser beam on the sheet carrying the image recorded thereon, and by detecting light carrying the image information (for example, light reflected by the sheet, light transmitted therethrough, or light emitted thereby), which light is obtained when the sheet is exposed to the light beam, by use of a light detection means provided with photomultiplier or the like have heretofore been widely used as scanners for plate making, input apparatuses of a computer, and image readout apparatuses of a facsimile.

Also, when certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then scanned with stimulating rays such as a laser beam which cause it to emit light in proportion to the stored radiation energy. The light emitted by the stimulable phosphor sheet upon stimulation thereof is photoelectrically detected and converted to electric image signals, and the radiation image of the object is reproduced as a visible image by use of the image signals on a recording material such as photographic film, a display device such as a cathode ray tube (CRT), or the like.

In the aforesaid radiation image recording and reproducing system, the radiation image stored on the stimulable phosphor sheet is read out by deflecting stimulating rays and scanning stimulating rays on the stimulable phosphor sheet in a main scanning direction in a radiation image read-out apparatus, simultaneously moving the stimulable phosphor sheet with respect to stimulating rays in a sub-scanning direction approximately normal to the main scanning direction, thereby scanning the overall surface of the stimulable phosphor sheet by stimulating rays, and photoelectrically detecting light emitted by the scanned portion of the stimulable phosphor sheet by use of a photodetector.

On the other hand, the image read out in the read-out apparatus such as the aforesaid radiation image read-out apparatus is reproduced as a visible image by, for example, scanning a light beam modulated in accordance with the image signals obtained by the read-out apparatus in the main scanning direction on a recording sheet which is being moved with respect to the light beam in the sub-scanning direction, and recording the visible image on the recording sheet. Therefore, in order to form the final visible image of the image, which was recorded on the image information sheet such as the stimulable phosphor sheet, on the recording sheet, it has heretofore been necessary to provide the reproducing apparatus for reproducing the image on the recording sheet, besides the read-out apparatus for reading out the image.

Particularly, in the case of the aforesaid radiation image recording and reproducing system, various attempts have been made in recent years to simplify the overall system as much as possible, to make the apparatus smaller as a whole and to reduce the manufacturing cost thereof. As one of such attempts, it has been proposed in Japanese Unexamined Patent Publication No. 58(1983)-184677 to form the conventional read-out apparatus, wherein scanning with a light beam is carried out, and the conventional reproducing apparatus, wherein scanning with a light beam is carried out, integrally with each other and to carry out image read-out and image reproduction by use of the same scanning system.

In the read-out and reproducing apparatus mentioned above, scanning must be carried out by use of a light beam of a predetermined optical amount in the course of image readout, and scanning must be carried out by use of a light beam modulated in accordance with the image information in the course of image reproduction. Accordingly, in the read-out and reproducing apparatus proposed in Japanese Unexamined Patent Publication No. 58(1983)-184677, a light modulator is moved into the light beam in the course of image reproduction, and is retracted from the light beam in the course of image read-out. In this case, a mechanism for moving the light modulator is necessary, and therefore the configuration becomes complicated.

SUMMARY OF THE INVENTION

The primary object of the present invention is to provide an image read-out and reproducing apparatus wherein a light modulator such as an acousto-optic modulator (AOM) is secured in an optical path of a light beam so that the mechanism is simplified and a suitable light beam is obtained in the course of image read-out and in the course of image reproduction.

Another object of the present invention is to provide an image read-out and reproducing apparatus wherein a zero-order light component and a first-order light component produced by the same AOM are utilized as a read-out light and a reproducing light respectively, and the optical amount of the reproducing light is adjusted in the course of image reproduction without the number of optical elements being increased.

The present invention provides a first image read-out and reproducing apparatus comprising:

(i) a light beam source for producing a light beam, (ii) an acousto-optic modulator (AOM) provided in an optical path of said light beam, (iii) a change-over means for selectively guiding any one of a zero-order light component and a first-order light component, which are radiated by said AOM, to a predetermined optical path, (iv) a light deflector positioned in said predetermined optical path for reflecting the incident light beam and scanning an image information sheet carrying an image recorded thereon or a recording sheet, on which said image is to be reproduced, by the deflected light beam in a main scanning direction, (v) a sub-scanning means for moving said image information sheet or said recording sheet with respect to said light beam in a sub-scanning direction approximately normal to said main scanning direction, and (vi) a light detection means for detecting light obtained from said image information sheet when said image information sheet is scanned by said light beam, wherein in the course of movement of said image information sheet by said sub-scanning means, said change-over means guides said zero-order light component to said predetermined optical path so that said zero-order light component is deflected by said light deflector to scan said image information sheet in the main scanning direction and the light obtained from said image information sheet is detected by said light detection means, thereby to carry out read-out of said image from said image information sheet, and in the course of movement of said recording sheet by said sub-scanning means, said change-over means guides said first-order light component to said predetermined optical path and said first-order light component is modulated by said AOM in accordance with image signals, so that the modulated first-order light component is deflected by said light deflector to scan said recording sheet in the main scanning direction, thereby to carry out reproduction of said image on said recording sheet.

The change-over means may be of any type insofar as the optical paths of the zero-order light component and the first-order light component radiated by the AOM are ultimately adjusted in the manner mentioned above. The change-over means itself may be disposed prior to the AOM or at the rear of the AOM. Also, the term "guiding a zero-order light component or a first-order light component to a predetermined optical path" as used herein means that the zero-order light component and the first-order light component are capable of being made to impinge upon approximately the same position of the same light deflector and deflected thereby. The optical paths of the zero-order light component and the first order light component may be slightly deviated from each other insofar as the deflection by the same light deflector in the manner as mentioned above is possible.

The present invention also provides a second image read-out and reproducing apparatus comprising:

(i) a light beam source for producing a light beam, (ii) an AOM provided in an optical path of said light beam, (iii) an optical adjusting means comprising a single optical-path changing optical element or a plurality of optical-path changing optical elements, and provided for selectively guiding any one of a zero-order light component and a first-order light component, which are radiated by said AOM, to a predetermined optical path by movement of at least one of said optical-path changing optical elements, at least one of said optical-path changing optical elements having an optical passage ratio adjusted to a predetermined value, (iv) a light deflector positioned in said predetermined optical path for deflecting the incident light beam and scanning an image information sheet carrying an image recorded thereon or a recording sheet, on which said image is to be reproduced, by the deflected light beam in a main scanning direction, (v) a sub-scanning means for moving said image information sheet or said recording sheet with respect to said light beam in a sub-scanning direction approximately normal to said main scanning direction, and (vi) a light detection means for detecting light obtained from said image information sheet when said image information sheet is scanned by said light beam, wherein in the course of movement of said image information sheet by said sub-scanning means, said optical path adjusting means guides said zero-order light component to said predetermined optical path so that said zero-order light component is deflected by said light deflector to scan said image information sheet in the main scanning direction and the light obtained from said image information sheet is detected by said light detection means, thereby carrying out read-out of said image from said image information sheet, and in the course of movement of said recording sheet by said sub-scanning means, said optical path adjusting means guides said first-order light component to said predetermined optical path by positioning at least said optical-path changing optical element, which has the optical passage ratio adjusted to the predetermined value, in the optical path and said first-order light component is modulated by said AOM in accordance with image signals, so that the modulated first-order light component is deflected by said light deflector to scan said recording sheet in the main scanning direction, thereby carrying out reproduction of said image on said recording sheet.

By the term "optical passage ratio" as used herein is meant the optical reflectivity of the optical-path changing optical element in the case where the optical-path changing optical element is constituted by a mirror or the like for changing the optical path by reflecting the light, or the optical transmittance of the optical-path changing optical element in the case where the optical-path changing optical element is constituted by a glass plate, as will be described later, or the like for transmitting the light and changing the optical path by refraction at the time of transmittance. In the case where the optical-path adjusting means is constituted by a single optical-path changing optical element, said optical-path changing element is constituted for movement and the optical passage ratio thereof is adjusted.

With the first and second image read-out and reproducing apparatuses in accordance with the present invention wherein a read-out apparatus and a reproducing apparatus which have heretofore been provided independently of each other are formed integrally with each other by carrying out both the image read-out and the production by use of the same sub-scanning system, and the read-out and the reproduction of the image are carried out in a single apparatus, the read-out and reproducing system as a whole can be simplified and made smaller as compared with the conventional read-out and reproducing system. Also, with the image read-out and reproducing apparatuses in accordance with the present invention wherein the scanning system is utilized for both image read-out and reproduction, only one each of the optical elements of the scanning system such as the light source and the deflection means need be provided, and therefore the manufacturing cost of the overall read-out and reproducing system can be reduced.

Also, with the first and second image read-out and reproducing apparatuses in accordance with the present invention, the optical paths of the zero-order light component and the first-order light component radiated by the AOM are changed selectively by the change-over means or the optical-path adjusting means so that the zero-order light component is guided to the predetermined optical path in the course of the image read-out and the first-order light component is guided to the predetermined optical path in the course of the image reproduction. Therefore, the image read-out and the image reproduction can be carried out appropriately without the AOM being moved between the image read-out and the image reproduction. Specifically, the AOM radiates the zero-order light component and the first-order light component of a predetermined optical amount in different directions in accordance with the modulation signals. The output of the zero-order light component cannot be made zero, and fog arises in a reproduced visible image when the image is reproduced by use of the zero-order light component. Therefore, the zero-order light component is not suitable as the reproducing light, and the first-order light component should be used as the reproducing light. On the other hand, in the course of the image read-out, the light beam is often utilized as stimulating rays, and therefore it is necessary to obtain a light beam of as large an output as possible and of a predetermined optical amount. However, in the case where the first-order light component is also used at the time of the image read-out, the optical amount of the first-order light component is at the most approximately 90% of the optical amount of the light beam incident upon the AOM, and the energy of the first-order light component is insufficient for stimulating rays. With the first and second image read-out and reproducing apparatuses in accordance with the present invention wherein the change-over means or the optical-path adjusting means is provided as mentioned above, the zero-order light component can be utilized as the read-out light such as stimulating rays and the first-order light component can be utilized as the reproducing light while the AOM is being secured. Accordingly, in the course of the image reproduction, an image of high image quality free from fog can be reproduced by use of the first-order light component. On the other hand, when modulation by the AOM is deactivated, the zero-order light component can be taken up in a ratio of approximately 100% to the optical amount of the light incident upon the AOM, and the optical amount can be made larger than the first-order light component. Therefore, in the course of the image read-out, a light beam of a large optical amount sufficient for stimulating rays can be obtained. Also, in the case where the image read-out and the image reproduction are carried out in this manner, no movement mechanism is necessary for the AOM, and therefore the configuration of the apparatus can be simplified.

Also, with the second image read-out and reproducing apparatus in accordance with the present invention wherein the optical path adjusting means is utilized and the optical passage ratio of at least one optical-path changing optical element of the optical-path adjusting means is adjusted, the optical amount of the first-order light component as the reproducing light can be adjusted. Therefore, no optical element such as an ND filter need be provided besides the optical path adjusting means, and the number of the optical elements can be reduced.

BRIEF DESCRIPTION OF THE DRAWINGS

FIGS. 5A, 5B and FIGS. 6A, 6B are plan views showing the sections in the vicinity of the change-over means in further embodiments of the image read-out and reproducing apparatus in accordance with the present invention, and FIG. 7 is a schematic side view showing a read-out and reproducing system wherein the embodiment of the image read-out and reproducing apparatus in accordance with the present invention is employed as a read-out and reproducing section.

DESCRIPTION OF THE PREFERRED EMBODIMENTS

The present invention will hereinbelow be described in further detail with reference to the accompanying drawings.

Figure 1:
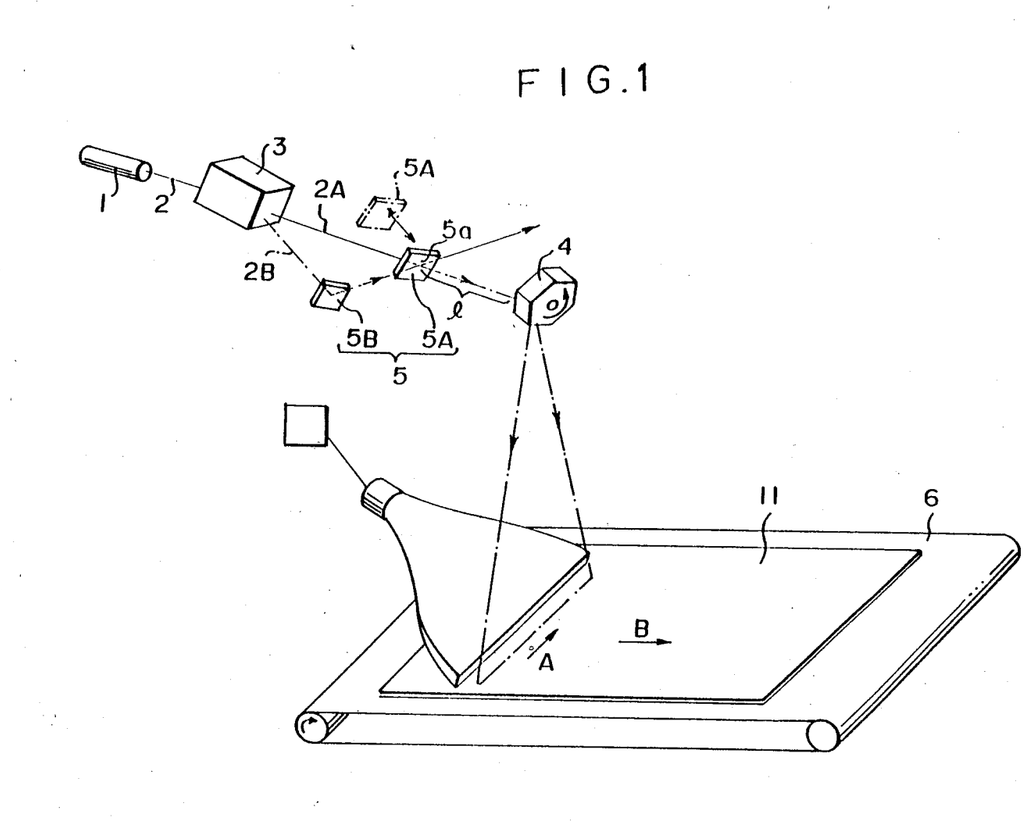
FIGS. 1 and 2 are perspective views showing an embodiment of the image read-out and reproducing apparatus in accordance with the present invention, which is constituted as a radiation image read-out and reproducing apparatus.
Figure 2:
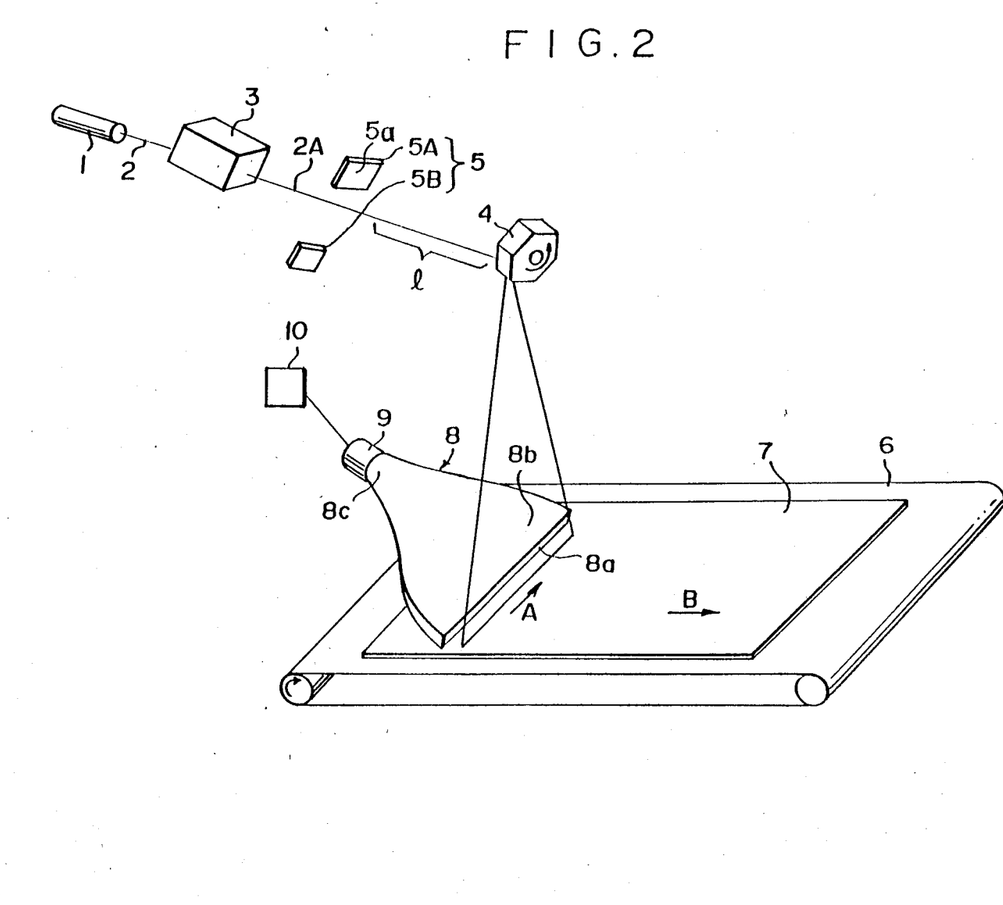

FIGS. 1 and 2 show the conditions of an embodiment of the image read-out and reproducing apparatus in accordance with the present invention, which is constituted as a radiation image read-out and reproducing apparatus, at the time of image reproduction and at the time of image read-out.

A light beam 2 produced by a light beam source 1 constituted by a He-Ne laser beam source or the like impinges upon an acousto-optic modulator (AOM) 3. At the time the light beam 2 is to be modulated, the AOM 3 splits the light beam 2 incident thereupon into a zero-order light component 2A and a first-order light component 2B, and radiates them in directions different from each other as shown in FIG. 1. When modulation is stopped, the AOM 3 radiates the zero-order light component 2A alone as shown in FIG. 2. This embodiment is provided with a rotating polygon mirror 4 as a light deflector for reflecting and deflecting the zero-order light component 2A or the first-order light component 2B. Also, a change-over means 5 for selectivity guiding either one of the zero-order light component 2A and the first-order light component 2B to a predetermined optical path incident upon the rotating polygon mirror 4 is provided between the AOM 3 and the rotating polygon mirror 4. In FIGS. 1 and 2, the predetermined optical path is indicated by l. In this embodiment, the change-over means 5 is composed of a first mirror 5A and a second mirror 5B. The first mirror 5A is moveable between a first position in the optical path of the zero-order light component 2A, at which the first mirror 5A reflects the zero-order light component 2A outward of the predetermined optical path l, and a second position retracting from the optical path of the zero-order light component 2A and allowing the zero-order light component 2A to be radiated to the predetermined optical path. The second mirror 5B is provided in the optical path of the first-order light component 2B for reflecting the first-order light component 2B and guiding the first-order light component 2B to the predetermined optical path 1 in cooperation with the first mirror 5A moved to its first position. A light input surface 5a of the first mirror 5A upon which the first-order light component 2B impinges is formed as a reflecting surface, and the surface opposite to the light input surface 5a is formed as a reflecting surface, an irregular reflection surface, or a light absorbing surface. Image read-out in this embodiment will hereinbelow be described with reference to FIG. 2.

In the course of image read-out, modulation of the AOM 3 is stopped, and all the light beam 2 incident upon the AOM 3 is directly radiated by the AOM 3 as the zero-order light component 2A, while no first-order light component 2B is radiated thereby. At this time, the first mirror 5A is moved to its second position retracting from the optical path of the zero-path light component 2A. Therefore, the zero-order light component 2A is radiated to the predetermined optical path 1, impinges upon the rotating polygon mirror 4, and is reflected and deflected by the rotating polygon mirror 4 which is being rotated in the direction indicated by the arrow. On the other hand, below the rotating polygon mirror 4, a stimulable phosphor sheet 7 carrying a radiation image stored thereon is moved in a sub-scanning direction as indicated by the arrow B by an endless belt device 6 as a sub-scanning means. The zero-order light component 2A reflected and deflected by the rotating polygon mirror 4 in the manner mentioned above repeatedly scans the stimulable phosphor sheet 7 in a main scanning direction as indicated by the arrow A approximately normal to the sub-scanning direction, and consequently the overall surface of the stimulable phosphor sheet 7 is two-dimensionally scanned by the zero-order light component 2A.

The zero-order light component 2A acts in the same manner as stimulating rays for the stimulable phosphor sheet 7. As the stimulable phosphor sheet 7 is scanned by the zero-order light component 2A, the stimulable phosphor sheet 7 exposed to the zero-order light component 2A emits light in proportion to the stored radiation energy. The emitted light (not shown) enters a transparent light guide member 8 having a light input end face 8a positioned in parallel with the main scanning line in the vicinity of the stimulable phosphor sheet 7. The light guide member 8 has a flat front end portion 8b positioned close to the stimulable phosphor sheet 7, and is formed gradually into a cylindrical shape toward the rear end side to form an approximately cylindrical rear end portion 8c, which is put into close contact with a photomultiplier 9 acting as a photodetector. The light emitted by the stimulable sheet 7 and entering the light guide member 8 from its light input end face 8a is condensed to the rear end portion 8c and is received by the photomultiplier 9. The photomultiplier 9 converts the detected light into electric signals, which are then sent to an image processing circuit 10 and subjected to image processing.

As shown in FIG. 1, after the image read-out is finished, a recording sheet 11 constituted by a photographic film, a photographic paper or the like is moved by the endless belt device 6 in the direction indicated by the arrow B, thereby reproducing the radiation image thus read out. Also, before the recording sheet 11 is thus moved, the first mirror 5A of the change-over means 5 is moved to its first position.

In the course of reproduction of the radiation image on the recording sheet 11, The AOM 3 is operated in accordance with the electric image signals read out in the manner mentioned above, and the AOM 3 modulates the incident light beam 2 in accordance with the electric image signals, splits the light beam 2 into the zero-order light component 2A and the first-order light component 2B, and radiates them. The zero-order light component 2A impinges upon the first mirror 5A moved to its first position as mentioned above, and is prevented by the first mirror 5A from impinging upon the rotating polygon mirror 4. On the other hand, the first-order light component 2B is reflected by the second mirror 5B, then impinges upon the first mirror 5A, is reflected by the first mirror 5A to the predetermined optical path 1, and is reflected and deflected by the rotating polygon mirror 4. The first-order light component 2B thus reflected and deflected repeatedly scans the recording sheet 11, which is moved in the sub-scanning direction as indicated by the arrow B, as a reproducing light in the main scanning direction as indicated by the arrow A. As a result, the radiation image which was readout from the stimulable phosphor sheet 7 is reproduced over the overall surface of the recording sheet 11. The recording sheet 11 carrying the radiation image reproduced thereon is sent to an automatic developing machine (not shown) and is subjected to development processing.

Figure 3:
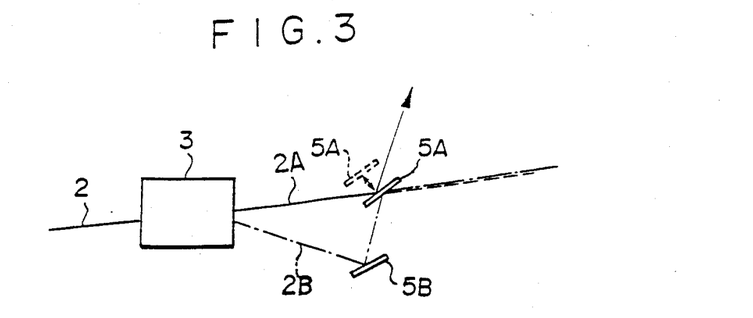
FIG. 3 is a plan view showing the section in the vicinity of the change-over means in the embodiment shown in FIG. 1.

With this embodiment wherein the image read-out from the stimulable phosphor sheet 7 and the image reproduction on the recording sheet 11 is carried out by use of the same scanning system, the read-out and reproduction system as a whole can be simplified and made smaller and the cost thereof can be reduced as compared with the case where a read-out apparatus and a reproducing apparatus are provided independently of each other. Also, the light modulator need not be moved into and out of the optical path of the light beam, and the configuration can be simplified. Further, with this embodiment wherein the optical path of the zero-order light component 2A and the optical path of the first-order light component 2B are changed over, scanning can be carried out by use of a suitable light beam in the course of the image read-out and in the course of the image reproduction. Specifically, as shown in FIG. 3, when modulation of the light beam 2 incident upon the AOM 3 is stopped, the AOM 3 radiates the light beam 2 directly as the zero-order light component 2A. Therefore, when the zero-order light component 2A is utilized as the read-out light, a read-out light of an optical amount equal to the optical amount of the light beam 2 can be obtained without being adversely affected by the provision of the AOM 3 on the optical path of the light beam 2, and the image read-out can be carried out appropriately by use of the read-out light having high energy. Also, in the course of the image reproduction, the first mirror 5A is moved to the position indicated by the solid line to intercept the zero-order light component 2A and to guide the first-order light component 2B to the predetermined optical path, thereby carrying out image reproduction by use of the first-order light component 2B. As for the first-order light component 2B, the output can be made zero, and therefore an image having a high image quality free from fog can be reproduced.

Figure 4:
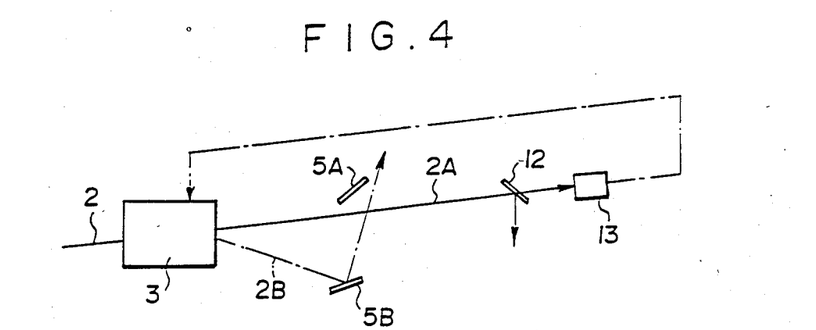
FIG. 4 is a plan view showing the section in the vicinity of the change-over means in another embodiment of the image read-out and reproducing apparatus in accordance with the present invention.

As shown in FIG. 4, in the case where the output of the light beam source 1 has a margin and the image read-out can be carried out appropriately without using all of the light beam 2 incident upon the AOM 3, the AOM 3 may also be operated in the course of the image read-out to steadily modulate so that the energy of the zero-order light component 2A is slightly restricted. In this case, a beam splitter 12 may be provided in the optical path of the zero-order light component 2A, the energy of the zero-order light component 2A may be detected by a photodetector 13, and the detected value may be fed back to the AOM 3 to accurately make the energy of the zero-order light component 2A constant. With this configuration, the optical amount of the read-out light (zero-order light component) can also be prevented from fluctuating in such a case as where the output of the light beam source attenuates with the passage of time.

Further, in the case where noise components are contained in the output of the light beam 2, it is also possible to monitor the power of the output light beam and feedback-control the AOM 3 to eliminate the noise components by restricting the output power of the light beam only by the amount to cutting the noise components.

In the aforesaid embodiment, a plurality of mirrors are used as the change-over means for guiding the zero-order light component and the first-order light component selectively to the predetermined optical path. However, the change-over means is not limited to the one in the aforesaid embodiments, and any change-over means may be used insofar as the zero-order light component alone is guided to the predetermined optical path in the course of the image read-out and the first-order light component alone is guided to the predetermined optical path in the course of the image reproduction. For example, as the change-over means, a light-permeable member as shown in FIGS. 5A and 5B may be used.

Figure 5A:
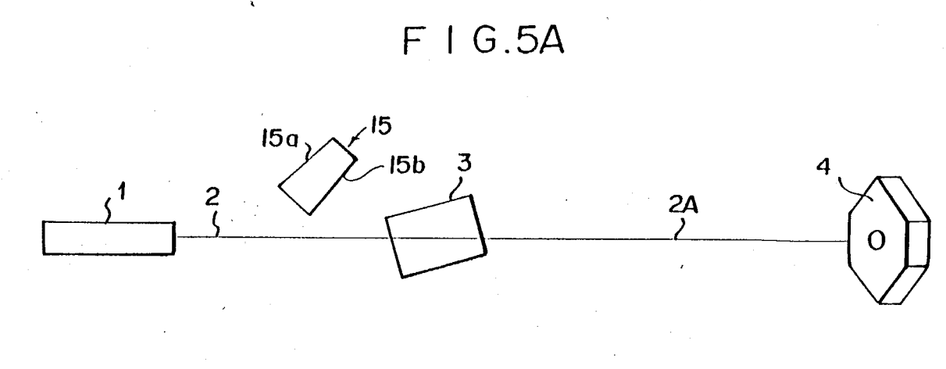
Figure 5B:
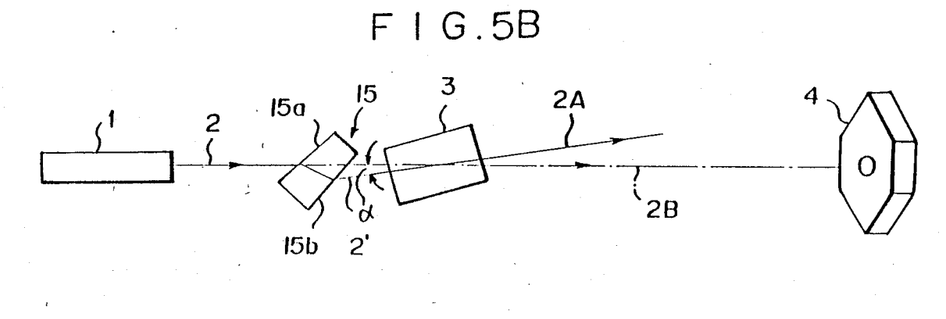

Specifically, in the embodiment shown in FIGS. 5A and 5B, a glass 15 moveable into and out of the optical path of the light beam 2 is provided as the light-permeable member between the light beam source 1 and the AOM 3. In the course of the image read-out as shown in FIG. 5A, the glass plate 15 is moved outward of the optical path of the light beam 2, and the zero-order light component 2A of a predetermined intensity alone is radiated by the AOM 3, upon which the light beam 2 impinges, to the predetermined optical path in the manner mentioned above, and utilized for the image read-out.

On the other hand, in the course of the image reproduction, the AOM 3 is operated in accordance with image signals and radiates the zero-order light component 2A and the first-order light component 2B. Prior to this step, the glass plate 15 is moved into the optical path between the light beam source 1 and the AOM 3 as shown in FIG. 5B. The glass plate 15 is formed in a square prism-like shape wherein a light input surface 15a and a light output surface 15b are not parallel to each other, so that the incident light beam 2 is refracted by an angle α with respect to the direction of incidence thereof and is radiated as a light beam 2' out of the glass plate 15. The angle α is equal to the angle (Bragg angle) between the zero-order light component 2A and the first-order light component 2B radiated by the AOM 3. As the light beam 2' thus refracted impinges upon the AOM 3, diffraction of the first-order light component 2B by the AOM 3 is apparently canceled, and the first-order light component 2B is radiated to the predetermined optical path in the same manner as the zero-order light component 2A at the time of the image read-out. In the course of the image reproduction, the zero-order light component 2A radiated by the AOM 3 advances in a direction inclined by the angle α from the predetermined optical path, and therefore does not impinge upon the rotating polygon mirror 4.

The glass plate mentioned above may be constituted to move into the optical path of the light beam in the course of the image read-out and to retract from the optical path of the light beam in the course of the image reproduction. In this case, such a glass plate should be used that refracts the light beam prior to impingement upon the AOM 3 in a direction of refraction equal to the direction in which the first-order light component 2B is radiated from the AOM 3 when the glass plate is not present in the optical path.

Instead of positioning the glass plate between the light beam source 1 and the AOM 3, the glass plate may be provided between the AOM 3 and the rotating polygon mirror 4. Specifically, in the case where the glass plate is to be moved into the optical path in the course of the image read-out and is to be retracted from the optical path in the course of the image reproduction, such a glass plate may be used that refracts the zero-order light component 2A, which is radiated by the AOM 3, in the course of the image read-out in a direction of refraction equal to the direction in which the first-order light component 2B is radiated from the AOM 3 at the time of the image reproduction. On the other hand, in the case where the glass plate is to be moved into the optical path in the course of the image reproduction and is to be retracted from the optical path in the course of the image read-out, said glass plate may be disposed in the course of the image reproduction at the position upon which both the zero-order light component 2A and the first-order light component 2B radiated by the AOM 3 impinge, so that the first-order light component 2B is refracted in the same direction as the direction in which the zero-order light component 2A is radiated at the time of the image read-out, and the zero-order light component 2A is refracted in a direction different from the aforesaid direction. In any case, when the optical path of the zero-order light component 2A at the time of the image reproduction becomes close to the optical path of the first-order light component 2B, a mirror or the like may be provided for again changing the optical path of the first-order light component 2B to a desired direction.

In the embodiment shown in FIGS. 1 to 4 wherein the optical path is changed over by use of the mirrors, the change-over mirrors may be provided between the light beam source and the AOM.

Also, as shown in FIGS. 6A and 6B, in the case where the light beam is a linearly polarized light beam such as a laser beam, the change-over means in the image read-out and reproducing apparatus in accordance with the present invention may be constituted to change over the optical path by adjusting the direction of polarization of the light beam.

Specifically, in the embodiment shown in FIGS. 6A and 6B, the change-over means for the zero-order light component 2A and the first-order light component 2B is composed of a shutter 25A moveable between a first position in the optical path of the zero-order light component 2A and a second position retracted from the optical path of the zero-order light component 2A, a halfwave plate 25B disposed in the optical path of the first-order light component 2B, a mirror 25C for adjusting the optical path of the first-order light component 2B, and a polarization beam splitter 25D upon which the zero-order light component 2A and the first-order light component 2B impinge in directions approximately normal to each other.

By way of example, the light beam 2 produced by the light beam source 1 is linearly polarized at an angle normal to the drawing sheet in FIGS. 6A and 6B. In the course of image read-out as shown in FIG. 6A, the shutter 25A is moved to its second position retracted from the optical path of the zero-order light component 2A, and the zero-order light component 2A radiated by the AOM 3 impinges upon the polarization beam splitter 25D. The polarization beam splitter 25D reflects the light polarized in the aforesaid direction. The zero-order light component 2A is reflected by the polarization beam splitter 25D, is thus guided to the predetermined optical path, and impinges upon the rotating polygon mirror 4 disposed in the optical path.

On the other hand, in the course of image reproduction, the AOM 3 is operated in accordance with the image signals, and radiates the zero-order light component 2A and the first-order light component 2B as shown in FIG. 6B. Prior to this step, the shutter 25A is moved to its first position for intercepting the zero-order light component 2A incident thereupon. The shutter 25A may be of the type absorbing the zero-order light component 2A incident thereupon or the type reflecting it. Also, the halfwave plate 25B is provided in the optical path of the first-order light component 2B, and the direction of polarization of the first-order light component 2B is changed by 90° by the halfwave plate 25B before the first-order light component 2B impinges upon the polarization beam splitter 25D. The optical path of the first-order light component 2B whose direction of polarization has been changed by the halfwave plate 25B as indicated by the arrow "a" in FIG. 6B is changed by the mirror 25C, and then the first-order light component 2B impinges upon the polarization beam splitter 25D in a direction approximately normal to the direction of incidence of the zero-order light component 2A. The polarization beam splitter 25D transmits the light polarized in the direction as indicated by the arrow "a". The first-order light component passes through the polarization beam splitter 25D, and is thus radiated to the predetermined optical path in the same manner as the zero-order light component 2A at the time of image read-out.

In the embodiment shown in FIGS. 6A and 6B, the shutter 25A alone is moved. Therefore, the accuracy of the movement position need not be controlled so strictly and it is easy to carry out the movement as compared with the case where a reflection mirror or a light-permeable member is moved.

It is sufficient for the halfwave plate 25B to make the direction of polarization of the zero-order light component 2A and the direction of polarization of the first-order light component 2B different from each other by 90°. Therefore, the halfwave plate 25B may be provided in the optical path of the zero-order light component 2A. Also, in the case where the operation of the AOM 3 is stopped and no first-order light component 2B is radiated thereby in the course of image read-out as in the embodiment shown in FIGS. 6A and 6B, the shutter 25A may act to intercept the zero-order light component 2A in the course of image reproduction. However, in the case where the AOM 3 is operated and the first-order light component 2B is radiated thereby also in the course of image read-out as in the embodiment shown in FIG. 4, the shutter 25A must be moved from the optical path of the zero-order light component 2A into the optical path of the first-order light component 2B at the time of image read-out.

A further embodiment of the image read-out and reproducing apparatus in accordance with the present invention will be described hereinbelow. In this embodiment, the first mirror 5A of the change-over means (the optical-path adjusting mirror group as an optical-path adjusting means) 5 is modified so that the optical reflectivity of the light input surface 5a with respect to the first-order light component 2B is adjusted to a predetermined value by the processing of the light input surface 5a. Therefore, in the course of image reproduction on the recording sheet 11, the first-order light component 2B radiated by the AOM 3 and reflected by the second mirror 5B impinges upon the light input surface 5a of the first mirror 5A moved to its first position as mentioned above, and is reflected by the first mirror 5A at the predetermined optical reflectivity to the predetermined optical path 1. Then, the first-order light component 2B is reflected and deflected by the rotating polygon mirror 4.

In the embodiment wherein a mirror adjusted to the predetermined optical reflectivity is used as the aforesaid first mirror 5A, the reproducing light of a desired optical amount level in accordance with the sensitivity of the recording sheet can be obtained. Also, the optical amount of the first-order light component 2B can be adjusted in accordance with the sensitivity of the recording sheet by exchanging the first mirror 5A with a mirror having an appropriate optical reflectivity, thereby, for example, to decrease the optical amount of the first-order light component 2B used for scanning by use of a mirror having a low optical reflectivity in the case where the sensitivity of the recording sheet is high. Therefore, no optical element such as an ND filter need be provided for the purpose of optical amount adjustment alone, and the number of optical elements can be reduced. Instead of the first mirror 5A, the optical reflectivity of the second mirror 5B may be adjusted. Also, the number and layout of a plurality of mirrors constituting the optical-path adjusting mirror group are not limited to those shown in FIG. 1. Any mirror may be used as the mirror whose optical reflectivity is adjusted to a predetermined value insofar as said mirror is not positioned in the optical path of the zero-order light component 2A as the read-out light. In the case where the number of mirrors positioned in the optical path of the first-order light component 2B alone is two or more, the optical reflectivity values of a plurality of the mirrors may be adjusted to predetermined values, and the optical amount of the first-order light component 2B may be adjusted by these mirrors. Also, in the case where the mirror that is moved does not have the optical amount adjusting mechanism, said mirror may be constituted for movement between the position in the optical path of the zero-order light component 2A for reflecting the zero-order light component 2A and the position retracting from the optical path of the zero-order light component 2A.

Also, as the optical-path adjusting means, instead of the aforesaid optical-path adjusting mirror group, the light-permeable member as shown in FIGS. 5A and 5B may be used. In this case, a film for adjusting the amount of passing light by reflecting or absorbing a part of the incident light is overlaid on the light input surface 15a or the light output surface 15b of the glass plate 15 as the light-permeable member. The optical amount of the scanning light in the course of the image reproduction is adjusted by the film. As in the case of the aforesaid reflecting mirrors, the glass plate 15 may be exchanged with a glass plate having an appropriate optical transmittance in accordance with the sensitivity of the recording sheet on which the image reproduction is to be carried out. Adjustment of the amount of passing light may also be carried out by coloring the overall glass plate in a predetermined density. Also, instead of positioning the glass plate between the light beam source 1 and the AOM 3, the glass plate may be provided between the AOM 3 and a light deflector such as the rotating polygon mirror 4. In this case, the glass plate may be disposed only in the course of the image reproduction at the position upon which both the zero-order light component 2A and the first-order light component 2B impinge, so that the first-order light component 2B is refracted and radiated in the same direction as the direction in which the zero-order light component 2A is radiated when no glass plate is provided.

FIG. 7 shows a read-out and reproducing system wherein the aforesaid radiation image read-out and reproducing apparatus in accordance with the present invention is employed as a read-out and reproducing section. The manner of usage of the radiation image read-out and reproducing apparatus in accordance with the present invention will hereinbelow be described with reference to FIG. 7.

With reference to FIG. 7, the read-out and reproducing system is provided with a cassette holding section 110 for releasably holding a cassette 102 capable of housing a stimulable phosphor sheet 7 therein, a read-out and reproducing section 120 for reading out a radiation image stored on the stimulable phosphor sheet 7 and reproducing the radiation image thus read out, an erasing section 130 for erasing radiation energy remaining on the stimulable phosphor sheet 7 after image read-out therefrom is finished at the read-out and reproducing section 120, a stacker 140 capable of housing a plurality of the stimulable phosphor sheets 7, 7, . . . therein and feeding out the housed stimulable phosphor sheets 7, 7, . . . one after another, and a recording sheet feeding section 150 for releasably holding a recording sheet feed magazine 103 in which a plurality of recording sheets 11, 11, . . . are housed. The sections 110, 120, 130, 140 and 150 are approximately aligned with one another in the vertical direction, and a sheet conveyance means 100 for conveying the stimulable phosphor sheets 7, 7, . . . and the recording sheets 11, 11, . . . . extends vertically beside these sections. The aforesaid sections 110, 120, 130, 140 and 150 are connected with the sheet conveyance means 100.

The stimulable phosphor sheet 7 is subjected to image recording in an external image recording apparatus (not shown) in the form housed in the cassette 102, and the cassette 102 housing the image-recorded stimulable phosphor sheet 7 is fed to the cassette holding section 110. Each of the cassettes 102, 102, . . . is light-tight so that the stimulable phosphor sheet 7 is prevented from exposure to external light when it is exposed to a radiation to have a radiation image recorded thereon. The cassette 102 comprises a cassette body 102a in which the stimulable phosphor sheet 7 is to be housed and an openable cover member 102b. When the cassette 102 is fed into the cassette holding section 110, the cover member 102b is maintained in the closed position. When the stimulable phosphor sheet 7 is to be taken out of the cassette 102 at the cassette holding section 110, the cover member 102b is opened as shown in FIG. 7 by a cover opening means 111 constituted by a suction cup or the like. After the cover member 102b is opened, a stimulable phosphor sheet take-out means 112 constituted by a suction cup or the like advances into the cassette 102, and sucks and takes the stimulable phosphor sheet 7 out of the cassette 102. The stimulable phosphor sheet take-out means 112 then transfers the stimulable phosphor sheet 7 to nip rollers 100a constituting a part of the sheet conveyance means 100 in the vicinity of the cassette 102. The stimulable phosphor sheet 7 has been housed in the cassette 102 with its front surface provided with a stimulable phosphor layer facing down.

The sheet conveyance means 100 is composed of endless belts, guide plates, rollers, and sheet distributing means. The stimulable phosphor sheet 7 whose leading edge portion is grasped between the nip rollers 100a is conveyed by the sheet conveyance means 100 in the direction as indicated by the arrow C1, guided by the sheet distributing means 100b positioned as indicated by the solid line, and conveyed in the direction as indicated by the arrow C2. The stimulable phosphor sheet 7 is then conveyed in the directions as indicated by the arrows C3 and C4 to the read-out and reproducing section 120. Also, a secondary erasing section 180 is provided in the conveyance path of the stimulable phosphor sheet 7 for carrying out secondary erasing by an erasing light source 181 as will be described later. The erasing light source 181 is maintained off at the time the stimulable phosphor sheet 7 taken out of the cassette holding section 110 is conveyed from above the secondary erasing section 180. also, at the time the stimulable phosphor sheet 7 taken out of the cassette 102 is directly sent to the read-out and reproducing section 120, sheet distributing means 100c and 100d between the secondary erasing section 180 and the read-out and reproducing section 120 are maintained at the positions as indicated by the solid lines, and allow the stimulable phosphor sheet 7 to be conveyed downward.

At the read-out and reproducing section 120, the light beam 2 produced by the light beam source 2 is made to impinge upon the AOM 3, thereby to carry out image read-out from the stimulable phosphor sheet 7 by use of the zero-order light component 2A, and to carry out image reproduction on the recording sheet 11 by use of the first-order light component 2B. Of the elements in the read-out and reproducing section 120, similar elements are numbered with the same reference numerals with respect to FIGS. 1 and 2. By way of example, the change-over means 5 for the zero-order light component 2A and the first-order light component 2B at the read-out and reproducing section 120 is provided with the mirrors 5A and 5B (not shown in FIG. 7) as mentioned above. As the change-over means 5, it is also possible to employ the aforesaid glass plate, or the combination of the halfwave plate with the polarization beam splitter. At the read-out and reproducing section 120, a galvanometer mirror 4' is provided as the light deflector. Also, the part of the sheet conveyance means 100 provided inside of the read-out and reproducing section 120 constitutes the sub-scanning means.

The stimulable phosphor sheet 7 sent to the read-out and reproducing section 120 is conveyed by the sheet conveyance means 100 in the direction as indicated by the arrow C5, and the overall surface of the stimulable phosphor sheet 7 is scanned two-dimensionally by the zero-order light component 2A guided by the change-over means 5 to the predetermined optical path. The light emitted by the stimulable phosphor sheet 7 in the course of the scanning is photoelectrically detected by the photomultiplier 9 via the light guide member 8. The electric signals thus obtained are sent to the image processing circuit 10 for carrying out image processing on the electric signals, and stored in a memory 14. After the image read-out from the overall surface of the stimulable phosphor sheet 7 is finished, the leading edge of the stimulable phosphor sheet 7 contacts a guide plate 100f with the tailing edge thereof being grasped between nip rollers 100e. From this position, the stimulable phosphor sheet 7 is switched back and conveyed in the direction as indicated by the arrow C6.

As for the radiation image read-out, there has heretofore been known a method wherein preliminary read-out for approximately ascertaining the radiation image stored on the stimulable phosphor sheet 1 is carried out prior to the aforesaid image read-out (final read-out) for obtaining electric image signals for use in reproduction of a visible image, image read-out conditions for the final read-out or the like are adjusted based on the information obtained by the preliminary read-out, and the final read-out is carried out by use of the adjusted read-out conditions.

As disclosed in, for example, Japanese Unexamined Patent Publication No. 58(1983)-67240, the preliminary read-out may be conducted by scanning the stimulable phosphor sheet 7 with stimulating rays having stimulation energy of a level lower than the level of the stimulation energy of the light beam (stimulating rays) used in the final read-out, and detecting the light emitted by the stimulable phosphor sheet 7 in the course of the scanning by a photoelectric read-out means.

The read-out and reproducing section 120 may be constituted to carry out only the final read-out or both the preliminary read-out and the final read-out. For example, the preliminary read-out may be carried out by conveying the stimulable phosphor sheet 7 in the direction as indicated by the arrow C5, the stimulable phosphor sheet 7 may then be switched back and reversely conveyed in the direction as indicated by the arrow C6 to the read-out start position, and then the final read-out may be carried out while the stimulable phosphor sheet 7 is again conveyed in the direction as indicated by the arrow C5. The optical members at the read-out and reproducing section 120 are not limited to those as mentioned above. For example, as disclosed in Japanese Unexamined Patent Publication No. 62(1987)-16666, a long photomultiplier may be disposed along the main scanning line as the photoelectric read-out means for detecting the light emitted by the stimulable phosphor sheet 7.

A comparatively long time is taken for carrying out the image read-out at the read-out and reproducing section 120, and therefore it often occurs that processing of the stimulable phosphor sheets cannot be achieved efficiently in the case where a cassette 102 housing a new image-recorded stimulable phosphor sheet 7 is loaded to the cassette holding section 110 after processing of the preceding stimulable phosphor sheet 7 is finished at the read-out and reproducing section 120.

Accordingly, this embodiment is provided with the stacker 140, so that the stimulable phosphor sheet 7 fed out of the cassette holding section 110 may be conveyed into the stacker 140 and made to wait for conveyance to the read-out and reproducing section 120 in accordance with the condition of the read-out and reproducing section 120.

The stacker 140 comprises a plurality of stimulable phosphor sheet housing compartments 142, 142, . . . defined by partitions 141, 141, . . . , and is moveable vertically in the direction as indicated by the arrow between the position as indicated by the solid line and the position as indicated by the broken line, so that every stimulable phosphor sheet housing compartment 142 can face nip rollers 100g disposed in the vicinity of the stacker 140. In the course of conveying the stimulable phosphor sheet 7 fed out of the cassette holding section 110 into the stacker 140, the sheet distributing means 100d is moved to the position as indicated by the broken line for guiding the stimulable phosphor sheet 17 conveyed from above toward the stacker 140. The stimulable phosphor sheet 7 is conveyed into a predetermined stimulable phosphor sheet housing compartment 142 of the stacker 140. After the tailing edge of the stimulable phosphor sheet 7 separates from the nip rollers 100g, the stimulable phosphor sheet 7 falls by its weight and is held with its leading edge contacting a stopper 143 in the stimulable phosphor sheet housing compartment 142. When the stimulable phosphor sheet 7 is to be fed out of the stacker 140, the stacker 140 is moved until the stimulable phosphor sheet housing compartment 142 in which the stimulable phosphor sheet 7 is housed faces the nip rollers 100g, the stopper 143 is then moved to the position as indicated by the broken line to push up the stimulable phosphor sheet 7 and to have the leading edge portion of the stimulable phosphor sheet 7 grasped by the nip rollers 100g. The stimulable phosphor sheet 7 grasped by the nip rollers 100g is guided by the sheet distributing means 100d maintained at the position as indicated by the broken line, is conveyed upward by the sheet conveyance means 100, and is then conveyed in the directions as indicated by the arrow C3 and C4 into the read-out and reproducing section 120. At this time, the stimulable phosphor sheet 7 fed out of the stacker 140 is once conveyed upward in this manner so that the surface of the stimulable phosphor sheet 7 provided with a stimulable phosphor faces up (i.e. the stimulable ray irradiation side) at the read-out and reproducing section 120.

After the image read-out from the stimulable phosphor sheet 7 is finished at the read-out and reproducing section 120, the stimulable phosphor sheet 7 is conveyed by the sheet conveyance means 100 in the directions as indicated by the arrows C7, C8 and C9 into the erasing section 130. At this time, the sheet distributing means 100b is maintained at the position as indicated by the broken line, and the sheet distributing means 100c and 100d are maintained at the positions as indicated by the solid lines.

At the erasing section 130, radiation energy remaining on the stimulable phosphor sheet 7 after the image read-out therefrom is finished is erased. Specifically, a part of the radiation energy stored on the stimulable phosphor sheet 7 at the image recording step remains stored thereon after the image read-out is carried out. In order to reuse the stimulable phosphor sheet 7, the residual radiation energy is erased at the erasing section 130. In this embodiment, the erasing section 130 is provided with a plurality of erasing light sources 131, 131, . . . constituted by fluorescent lamps, tungsten-filament lamps, sodium lamps, xenon lamps, iodine lamps or the like, and the stimulable phosphor sheet 7 is exposed to the erasing light emitted by the erasing sheet light sources 131, 131, . . . for releasing the residual radiation energy from the stimulable phosphor sheet 7 while the stimulable phosphor sheet 7 is conveyed along a guide plate 132 in the direction as indicated by the arrow C10. At the erasing section 130, any known erasing method may be used. For example, erasing may be conducted by heating or by a combination of exposure to the erasing light with heating. The stimulable phosphor sheet 7 is reversely conveyed in the direction as indicated by the arrow C11 after being conveyed up to the position as indicated by the broken line, and a guide plate for supporting the edge of the stimulate phosphor sheet 7 should preferably be provided outside of the erasing section 130. Also, as will be described later, in the case where a stimulable phosphor sheet housing tray 106 is provided close to the erasing section 130, the tray 106 may be utilized as a guide.

After erasing of the stimulable phosphor sheet 7 is finished at the erasing section 130, the stimulable phosphor sheet 7 is conveyed by the sheet conveyance means 100 in the directions as indicated by the arrows C12 and C13, and is housed in the empty stimulable phosphor sheet housing compartment 142 of the stacker 140 by being guided by the sheet distributing means 100d moved to the position as indicated by the broken line. In the case where some erased reusable stimulable phosphor sheets 7, 7, . . . are housed in the stacker 140 in this manner, the erased reusable stimulable phosphor sheet 7 can be conveyed into the empty cassette cassette 102 immediately after the image-recorded stimulable phosphor sheet 7 was fed out of the cassette 102 at the cassette holding section 110. When the stimulable phosphor sheet 7 is to be fed out of the stacker 140 and conveyed to the cassette holding section 110, the sheet distributing means 100d is moved to the position as indicated by the broken line, the sheet distributing means 100b and 100c are moved to the positions as indicated by the solid lines, and the stimulable phosphor sheet 7 is conveyed by the sheet conveyance means 100 in the directions as indicated by the arrows C14 and C15 into the cassette 102. The stimulable phosphor sheet 7 conveyed out of the stacker 140 may have often been maintained in the stacker 140 and a long time may have elapsed after the stimulable phosphor sheet 7 was subjected to erasing at the erasing section 130. In the case where at least a predetermined time elapses after the erasing was carried out on the stimulable phosphor sheet 7, the stimulable phosphor sheet 7 stores energy of radiations emitted by radioactive isotopes such as Ra226 and K40, which are contained in a trace amount in the stimulable phosphor, or energy of environmental radiations such as cosmic rays and X-rays emitted by other X-ray sources. These types of radiation energy undesirably stored on the stimulable phosphor sheet 7 cause noise in a radiation image recorded next on the stimulable phosphor sheet 7. In order to prevent noise generation, the secondary erasing section 180 for irradiating the erasing light to the stimulable phosphor sheet 7 is disposed in the conveyance path between the stacker 140 and the cassette holding section 110. The erasing light source 181 at the secondary erasing section 180 is turned on only when the stimulable phosphor sheet 7 fed out of the stacker 140 is conveyed toward the cassette holding section 110, thereby to release the radiation energy stored on the stimulable phosphor sheet 7 while the stimulable phosphor sheet 7 is being housed in the stacker 140. The cassette 102 loaded with the erased reusable stimulable phosphor sheet 7 in this manner is taken out of the read-out and reproducing system for reuse in image recording. In this embodiment, the stimulable phosphor sheet 7 erased at the erasing section 130 may be immediately conveyed into the cassette 102. In this case, the stimulable phosphor sheet 7 conveyed in the direction as indicated by the arrow C12 from the erasing section 130 may once be conveyed downward, then switched back upward and conveyed into the cassette 102. As a result, the surface of the stimulable phosphor sheet 7 provided with the stimulable phosphor layer can be made to face down when the stimulable phosphor sheet 7 is housed in the cassette 102.

On the other hand, in an external image recording apparatus, besides the image recording on the stimulable phosphor sheet 7 housed in the cassette 102, image recording may be carried out on a plurality of the stimulable phosphor sheets 7, 7, . . . taken one by one out of a sheet feed magazine for continuous image recording or the like. The stimulable phosphor sheets 7, 7, . . . each carrying a radiation image stored thereon are sequentially housed in a sheet housing magazine, which is then sent to a read-out apparatus. Besides the cassette holding section 110, the read-out and reproducing system shown in FIG. 7 may also be provided with a magazine holding section disposed for releasably holding the stimulable phosphor sheet magazine (i.e. the aforesaid sheet housing magazine) in a horizontal relation to the sheet conveyance means 100, so that the read-out and erasing can be carried out also for the stimulable phosphor sheets fed out of the stimulable phosphor sheet magazine. The magazine holding section may be provided at any position insofar as it approximately aligns with the aforesaid read-out and reproducing section 120, the erasing section 130 and other sections in the vertical direction and is connected with the sheet conveyance means 100. Also, as indicated by the chain line in FIG. 7, the cassette holding section 110 and the magazine holding section may be formed integrally with each other so that the cassette holding section 110 can be loaded with both the cassette 102 and a stimulable phosphor sheet magazine 107. In the case where the magazine holding section is provided, it is necessary to provide a tray holding section for holding a tray in which the stimulable phosphor sheets fed one by one out of the stimulable phosphor sheet magazine and subjected to the image read-out and erasing are to be housed. The tray holding section may be provided at any position connected with the sheet conveyance means 100. However, the tray holding section should preferably be provided outward from erasing section 130 so that the tray 106 is positioned adjacent the erasing section 130. In this case, as for the stimulable phosphor sheet 7 fed out of the cassette 102, the tray 106 can act in the same manner as a guide for guiding the stimulable phosphor sheet 7 in the course of the erasing. Also, as for the stimulable phosphor sheet fed out of the stimulable phosphor sheet magazine, the stimulable phosphor sheet can be made to fall into the tray 106 and housed therein after the erasing is finished.

On the other hand, at the time the image read-out from a single stimulable phosphor sheet 7 has been finished at the read-out and reproducing section 120 and the stimulable phosphor sheet 7 has been conveyed out of the read-out and reproducing section 120, a single recording sheet 11 is taken by a suction means 151 out of the recording sheet feed magazine 103 at the recording sheet feeding section 150, and transferred to nip rollers 100h in the vicinity of the recording sheet feeding section 150. The recording sheet 11 is conveyed by the nip rollers 100h along a guide plate 100i in the direction as indicated by the arrow D1, and is then conveyed by the sheet conveyance means 100 into the read-out and reproducing section 120 in the same manner as the stimulable phosphor sheet 7. At the read-out and reproducing section 120, the radiation image read from the stimulable phosphor sheet 7 in the manner as mentioned above is recorded on the recording sheet 11 while the recording sheet 11 is being conveyed in the direction as indicated by the arrow D2.

At the time the recording sheet 11 is thus conveyed in the read-out and reproducing section 120, the AOM 3 is operated in accordance with the image signals which were detected from the stimulable phosphor sheet 7, and the change-over means 5 guides the first-order light component 2B to the predetermined optical path. The recording sheet 11 is scanned by the first-order light component 2B modulated by the AOM 3, so that the radiation image which was stored on the stimulable phosphor sheet 7 is reproduced over the overall surface of the recording sheet 11.

After the image reproduction on the recording sheet 11 is finished at the read-out and reproducing section 120, the recording sheet 11 is conveyed by the sheet conveyance means 100 in the directions as indicated by the arrows D3, D4 and D5. At this time, the sheet distributing means 100d is maintained at the position as indicated by the solid line, and the sheet distributing means 100c is moved to the position as indicated by the broken line, thereby to guide the recording sheet 11 in the direction as indicated by the arrow D6 and to have the leading edge of the recording sheet 11 grasped between ejection rollers 100j. By way of example, the ejection rollers 100j may convey the recording sheet 11 to an automatic developing section 170 connected to the read-out and reproducing system. Alternatively, a tray or the like may be positioned close to the ejection rollers 100j, and the recording sheet 11, 11, . . . may be sequentially ejected into the tray or the like. Also, a holding section for the recording sheet housing tray may be provided inside of the read-out reproducing system, and the recording sheets 11, 11, . . . may be taken out of the system in the form housed in the tray and sent to an external automatic developing machine.

At the aforesaid read-out and reproducing section 120, the reproduction of the radiation image read-out from a single stimulable phosphor sheet 7 is carried out on a single recording sheet 11 immediately after the image read-out is carried out on the stimulable phosphor sheet 7. Instead, the capacity of the memory 14 may be increased, the image read-out may be carried out continuously for a plurality of the stimulable phosphor sheets at the read-out and reproducing section 120, image signals thus detected may be stored in the memory 14, and then the image reproduction may be carried out continuously on a plurality of the recording sheets. Also, instead of reproducing all of the read-out radiation images as hard copies on the recording sheets, the radiation images may be displayed on a display device such as a CRT, and only the necessary images may be reproduced as hard copies on the recording sheets.

As the recording sheet, besides the aforesaid ordinary silver halide photographic film, a dry silver suitable for heat development or the like may be used. Also, besides the photosensitive recording materials, a heat-sensitive recording material may also be used. As the development process in the case where the silver halide photographic film is used, instead of the aforesaid wet development process, an instant process or the like may be used. The image read-out and reproducing apparatus in accordance with the present invention is not limited to the radiation image read-out and reproducing apparatus wherein the stimulable phosphor sheet is used as the image information sheet, and may be of the type carrying out image read-out by detecting light reflected by the image information sheet or light transmitted through the image information sheet.

We claim:

1. An image read-out and reproducing apparatus comprising:
   (i) a light beam source for producing a light beam,
   (ii) a acousto-optic modulator provided in an optical path of said light beam,
   (iii) a change-over means for selectively guiding either one of a zero-order light component and a first-order light component, which are radiated by said acousto-optic modulator, to a predetermined optical path,
   (iv) a light deflector positioned in said predetermined optical path for deflecting the incident light beam and scanning an image information sheet carrying an image recorded thereon or a recording sheet, on which said image is to be reproduced, by the deflected light beam in a main scanning direction,
   (v) a sub-scanning means for moving said image information sheet or said recording sheet with respect to said light beam in a sub-scanning direction approximately normal to said main scanning direction, and
   (vi) a light detection means for detecting light obtained from said image information sheet when said image information sheet is scanned by said light beam,
   wherein in the course of movement of said image information sheet by said sub-scanning means, said change-over means guides said zero-order light component to said predetermined optical path so that said zero-order light component is deflected by said light deflector to scan said image information sheet in the main scanning direction and the light obtained from said image information sheet is detected by said light detection means, so as to carry out read-out of said image from said image information sheet, and
   in the course of movement of said recording sheet by said sub-scanning means, said change-over means guides said first-order light component to said predetermined optical path and said first-order light component is modulated by said acousto-optic modulator in accordance with image signals, so that the modulated first-order light component is deflected by said light deflector to scan said recording sheet in the main scanning direction, so as to carry out reproduction of said image on said recording sheet.

2. An apparatus as defined in claim 1 wherein said image information sheet is a stimulable phosphor sheet carrying a radiation image stored thereon, said light beam for scanning said stimulable phosphor sheet is stimulating rays which cause said stimulable phosphor sheet to emit light in proportion to the stored radiation energy, and said light detection means detects said light emitted by said stimulable phosphor sheet in proportion to the stored radiation energy 3. An apparatus as defined in claim 1 or 2 wherein said change-over means comprises a plurality of reflecting mirrors.

4. An apparatus as defined in claim 1 or 2 wherein said change-over means is a light-permeable member having a light input surface and a light output surface which are not parallel to each other, said light-permeable member being inserted into the optical path of said light beam only in the course of reproduction of said image.

5. An apparatus as defined in claim 1 or 2 wherein said change-over means is provided with a halfwave plate positioned in the optical path of either one of said zero-order light component and said first-order light component, a shutter moveable into and out of the optical path of said zero-order light component, and a polarization beam splitter for reflecting one of said zero-order light component and said first-order light component and transmitting the other thereof, thereby to radiate said zero-order light component and said first-order light component respectively to said predetermined optical path.

6. An image read-out and reproducing apparatus comprising:
(i) a light beam source for producing a light beam,
(ii) an acousto-optic modulator provided in an optical path of said light beam,
(iii) an optical path adjusting means comprising a single optical-path changing optical element or a plurality of optical-path changing optical elements, and provided for selectively guiding either one of a zero-order light component and a first-order light component, which are radiated by said acousto-optic modulator, to a predetermined optical path by movement of at least one of said optical-path changing optical elements, at least one of said optical-path changing optical elements having an optical passage ratio adjusted to a predetermined value,
(iv) a light deflector positioned in said predetermined optical path for deflecting the incident light beam and scanning an image information sheet carrying an image recorded thereon or a recording sheet, on which said image is to be reproduced, by the deflected light beam in a main scanning direction,
(v) a sub-scanning means for moving said image information sheet or said recording sheet with respect to said light beam in a sub-scanning direction approximately normal to said main scanning direction, and
(vi) a light detection means for detecting light obtained from said image information sheet when said image information sheet is scanned by said light beam,
wherein in the course of movement of said image information sheet by said sub-scanning means, said optical-path adjusting means guides said zero-order light component to said predetermined optical path so that said zero-order light component is deflected by said light deflector to scan said image information sheet in the main scanning direction and the light obtained from said image information sheet is detected by said light detection means, so as to carry out read-out of said image from said image information sheet, and
in the course of movement of said recording sheet by said sub-scanning means, said optical path adjusting means guides said first-order light component to said predetermined optical path by positioning at least said optical-path changing optical element, which has the optical passage ratio adjusted to the predetermined value, in the optical path and said first-order light component is modulated by said acousto-optic modulator in accordance with image signals, so that the modulated first-order light component is deflected by said light deflector to scan said recording sheet in the main scanning direction, so as to carry out reproduction of said image on said recording sheet.

7. An apparatus as defined in claim 6 wherein said image information sheet is a stimulable phosphor sheet carrying a radiation image stored thereon, said light beam for scanning said stimulable phosphor sheet is stimulating rays which cause said stimulable phosphor sheet to emit light in proportion to the stored radiation energy, and said light detection means detects said light emitted by said stimulable phosphor sheet in proportion to the stored radiation energy.

8. An apparatus as defined in claim 6 or 7 wherein said optical-path adjusting means comprises a plurality of reflecting mirrors.

9. An apparatus as defined in claim 6 or 7 wherein said optical-path adjusting means is a light-permeable member having a light input surface and a light output surface which are not parallel to each other, and said light-permeable member is inserted into the optical path of said light beam only in the course of reproduction of said image.

* * * * *